D. Scully,
Cider Mill.
N° 43,434. Patented July 5, 1864.
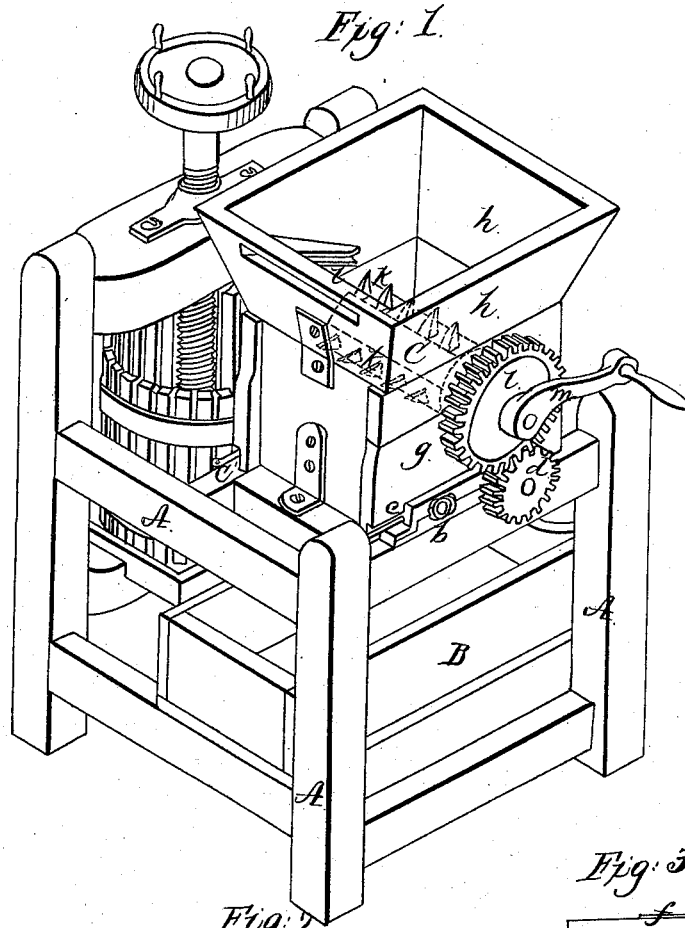
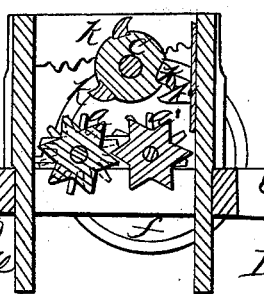
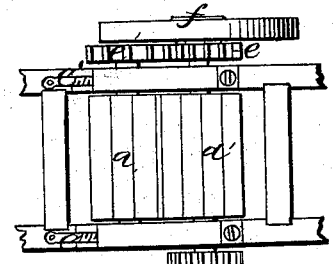
Witnesses:
J. Snowden Bell
John Meigs
Inventor: Daniel Scully
by his Attorneys
Baldwin & Son

UNITED STATES PATENT OFFICE.

DANIEL SCULLY, OF BALTIMORE, MARYLAND.

IMPROVEMENT IN CIDER-MILLS.

Specification forming part of Letters Patent No. 43,434, dated July 5, 1864.

*To all whom it may concern:*

Be it known that I, DANIEL SCULLY, of the city and county of Baltimore, in the State of Maryland, have invented a new and useful Improvement in Cider-Mills; and I do hereby declare that the following is a full, clear, and exact description of the construction and operation of the same, reference being had to the annexed drawings, making a part of this specification, and in which—

Figure 1 is an isometrical perspective view of my mill and press with the hopper in place. Fig. 2 is a transverse section through the cutting and grinding cylinders, and Fig. 3 is a plan view of the grinding-cylinders and their driving-gear.

It is the object of my invention to enable the cider-mill to do a larger amount of work in a given time than any now in use without requiring greater power than these less effective ones require; and my invention consists in the employment in the cider mill of rotary and stationary cutters to divide the fruit by sharp cutting edges before it passes to the crushing or grinding cylinders.

Upon a suitable frame, A, I mount a pair of grinding-rollers, $a$ and $a'$, over a receiving trough, B. The grinding-rollers have angular or rounded teeth working into each other, and must be adjustable to vary their distance apart. To render this adjustment accurate and simple I place the journals of the roller $a'$ in stationary boxes, while the boxes that support the journals of roller $a$ are permitted to move in slotted bearings, one of which is shown at $b$ in Fig. 1, and the position of these bearings is controlled at pleasure by the set-screws $c$ and $c'$, so that at any moment the pomace can be ground fine or coarse, as desired, or as the condition of the fruit may require. A pinion, $d$, on the outer end of the shaft of roller $a$ imparts motion to it, while the inner end thereof carries a cog-wheel, $e$, gearing with a cog wheel, $e'$, on the inner end of the shaft of roller $a$, and the motion of both rollers is equalized by a balance-wheel, $f$, on the inner end of the shaft of roller $a'$, which balance-wheel may also serve as a driving-pulley where power is used.

Over and around the grinding-rollers I place a box, $g$, to retain the fruit upon the rollers, surmounted by a hopper, $h$, having an adjustable slide-gate, $i$, to regulate the feed. Within this box and over the grinding-rollers I place a rotating knife-cylinder, C, armed with two or more longitudinal parallel rows of knives, $k'$, placing the knives at such a distance apart in the rows as to pass freely between a stationary row of knives, $k'$, secured to the inside of the box $g$, and projecting toward and nearly to the rotating knife-cylinder. The knife-cylinder C is supported on a shaft having its bearings in the box $g$, and the outer end of the shaft carries a cog-gear, $l$, that couples with and gives motion to the pinion $d$, that rotates the grinding-rollers, while the gear $l$ receives motion from the crank-arm $m$ on the end of the shaft.

As the fruit is fed from the hopper, it is cut between the rotary and stationary cutters, and passes in slices from between them to the crushing rollers, where its reduction to any degree of fineness is easily effected and at the expenditure of the minimum power required.

It is obvious that the speed of the knife cutting-cylinder can be augmented at pleasure, and thus largely augment the effective capabilities of the mill without requiring as much power as is required to crush the whole fruit in the ordinary cider-mill, even when doing a less quantity of grinding.

It is obvious that other fruits than apples, such as grapes and pears, can be reduced for the press in my mill.

What I claim as my invention, and desire to secure by Letters Patent, is—

The combination of a rotating cutting-cylinder, the stationary knives, and the crushing-rollers, arranged and operating substantially in the manner set forth.

In testimony whereof I have hereunto subscribed my name.

DANL. SCULLY.

Witnesses:
S. P. RICH,
GEO. C. CHARLES.